March 21, 1961 L. D. NINNEMAN ET AL 2,975,809
LOADING AND UNLOADING APPARATUS
Filed Dec. 10, 1956 6 Sheets-Sheet 1

FIG-1

INVENTORS:
L.D. NINNEMAN.
R.M. CRAYFORD.
BY Hugh A Kirk
ATTY.

United States Patent Office 2,975,809
Patented Mar. 21, 1961

2,975,809

LOADING AND UNLOADING APPARATUS

Lawrence D. Ninneman and Robert M. Crayford, Toledo, Ohio, assignors to Baker Brothers, Inc., Toledo, Ohio, a corporation of California Filed Dec. 10, 1956, Ser. No. 627,418

17 Claims. (Cl. 141—1)

This invention relates to automatic loading and unloading devices for a plurality of cavities arranged in a pattern. More particularly, it deals with such devices for distributing a plurality of pre-determined measured amounts of material particles in cups in a loader according to a predetermined pattern and simultaneous discharging all of the cups into a similar pattern of cavities, such as the cavities in a multi-cavity mold. For example, such devices may be operable in synchronism with molding presses, such as automatic thermosetting plastic molding presses, wherein a plurality of measured quantities of plastic material are simultaneously loaded into a corresponding plurality of mold cavities in the press, and after they are molded into units, they are then simultaneously removed from the press so that the mold cavities may be reloaded.

It is an object of this invention to produce such a loading and unloading apparatus which is universally adjustable for simultaneously depositing material particles into different size molds and mold cavities, different numbers of cavities in the molds, and different configurations of the cavities in the molds according to a regular repetitive pattern.

Another object is to produce such an apparatus which is simple, effective, efficient, economic, eliminates spillage, requires a minimum amount of maintenance, minimum amount of change-over time when the molds are changed, and is readily adaptable for high speed automatic top quality operation so that a higher production may be obtained at lower prices.

Another object is to produce such an apparatus which is quickly and easily assembled and adjusted and is adaptable to presses which have either upper or lower hydraulic molded part ejection systems.

Another object is to produce such an apparatus which may be automatically synchronized with the operation of a molding press; including automatic plastic molding presses, whereby the cycle time therefor may be reduced.

Another object is to produce such an apparatus in which individual cups as well as the rows of cups which are provided on the loading board, may be moved or eliminated to conform with different varieties of cavities in different molds, and have an automatic feeder or filler for the cups which may be adjusted to fill two or more rows of cups at a time, or put more than one charge in the same cup or cups, which charges also may be varied as to quantities.

Another object is to provide a loading and unloading apparatus which reciprocates rapidly but is decelerated at its ends of travel to insure accurate discharge of the material thereon, as well as means for vibrating the cups of material particles during their discharge to insure their rapid and complete emptying over the cavities to be filled.

Another object is to produce such an apparatus for unloading the pieces after they are molded and discharging them without transfer to a point remote from the press mold, and which also is sensitive and readily adjustable for unloading different types of molds with either upper or lower molded part ejection systems.

Generally speaking, the universal loading and unloading apparatus of this invention comprises separate, independently and alternately operated reciprocating boards or plates which move from positions at the side of a plurality of cavities, such as in a mold in a press, to a position over said cavities or in the press. The horizontally reciprocating loading board may comprise a plurality of bottom dischargeable cups which may be arranged in variably spaced rows with different or the same numbers of cups in each row, to correspond with a repetitive pattern of one or more rows corresponding to the pattern of the cavities in a mold. The filling of the cups may be provided by gravity from a metering device and hopper mounted above the loading board, which device may have a plurality of meters in a row for metering the desired quantities of material and discharging them through adjustable chutes or spouts directly into one or more adjacent rows of cups. While the press is molding one set of units or pieces in the multi-cavity mold, rows of cups in the loading board may be filled successively, and be ready for movement into the press for simultaneous discharge into the cavities of the mold as soon as the press has opened and the unloading device has removed the molded pieces therefrom. When the press has opened, the front edge of the loading board may be provided with air jet means for cleaning or blowing out the cavities in the mold, as it passes into the press. The discharge of all of the cups by gravity may be done simultaneously by a single gate means which slides horizontally beneath all of the cups on the loading board and may be operated by a stop during the final inward movement of the board into the press. The motion of the board reciprocating in and out of the press is preferably decelerated before the end of each of its strokes or travels, so as to prevent horizontally throwing or spilling of the material out of the cups when they are opened. After the board is in the press and the cavities have been opened, a timer may be instigated by a decelerating switch, which timer continues the operation of the board driving motor before it is reversed, so as to cause the board to pulsate or vibrate against its stop, thereby insuring the discharge of all of the material in the cups into the mold cavities by shaking it out of the cups.

The unloading of the press also may be automatically synchronized and correlated with the motion of the press, and may comprise a reciprocating plate-chute onto which the objects molded in the cavities in the mold in the press, either may be stripped by a comb on the end of the plate from a bottom ejecting mechanism, or may be deposited thereon as on a tray from a top ejecting mechanism. Then the unloading plate is horizontally removed from the press and tilted, either mechanically or hydraulically, so as to act as a chute for sliding the articles deposited thereon from the press off of the opposite end of the plate into a container or the like at a location away from the press.

The above mentioned and other features and objects of this invention and the manner of attaining them will become more apparent and the invention itself will be best understood by reference to the following description of embodiments of the invention taken in conjunction with the accompanying drawings, wherein.

I. THE PRESS

Although the loading and unloading device of this invention may be adapted for the filling of any group of a plurality of cavities in a plane arranged according to a predetermined pattern with particles of a dry material; and the unloading may be adapted for any one or more solid pieces which are collected at one place and are to be discharged at a distant place without re-handling; the description of this invention will be illustrated in combination with a hydraulic press for thermosetting plastic articles molded from measured quantities of granular plastic material into solid plastic units, such as bottle caps, including the automatic and rapid loading and unloading of all of the cavities in molds for such units in synchronism with the operation of the press. Therefore, reference is now had to Fig. 1, which discloses in perspective a plurality of cavities 30 arranged in similar rows in the lower platen 31 of a mold, which platen co-operates with an upper reciprocating platen 32 having a corresponding number of cavity co-operating plungers 33 for simultaneously forming a plurality of plastic articles in one pressing operation. The platens 31 and 32 are herein shown mounted in a hydraulic plastic press 35 comprising a base 36 upon which the platen 31 may be attached such as by means of bolts 37. Four pillars 38 extend upwardly from the base near its corners, on which pillars is mounted the head plate 39 for a hydraulic cylinder 40 which contains a piston that vertically reciprocates to raise and lower the upper platen 32 mounted by bolts 42 on the under side of a plate 41 guided by the columns 38.

II. THE LOADING DEVICE

Figure 1:
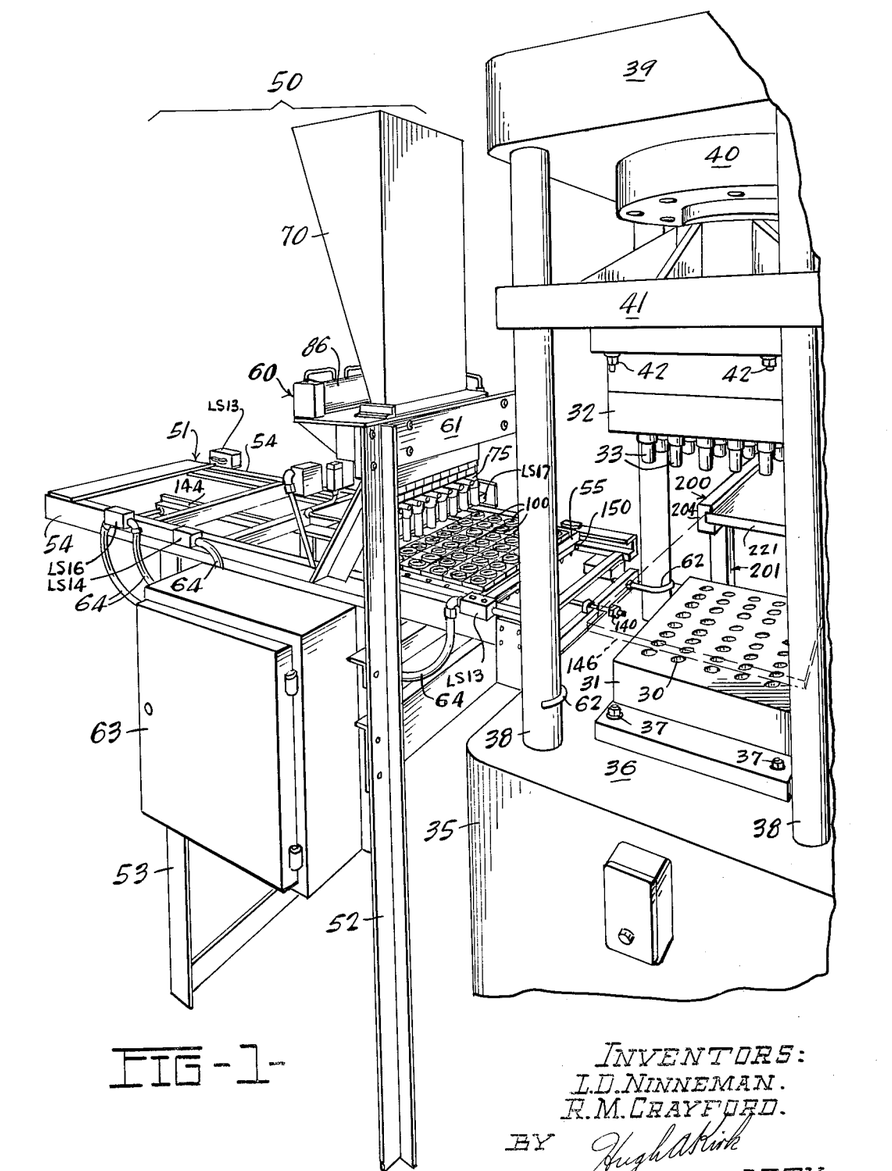
Fig. 1 is a perspective view of one embodiment of a loading and unloading apparatus according to this invention adapted to a hydraulic multicavity top ejection plastic molding press with parts of the press and unloading device being broken away, the unloading device being shown behind the press and at right angles to the loading device at the left of the press and also being shown in dotted lines in its forward position in the press.

Referring now to Figs. 1, 2, 5, 6 and 7 there is shown all or parts of one embodiment of a loading device 50 of this invention, which may be mounted on a frame 51 which may comprise a pair of forward legs 52 and a pair of rearward legs 53 shorter than the forward legs. These legs support a pair of horizontal rails or tacks 54 upon which the loading board 55 reciprocates to extend beyond the forward end of the frame 51 into the press 35 over the cavities 30 of the mold platen 31, and rearwardly out of the press and under the filling and metering device 60 which is supported above the rails 54 on the longer legs 52 connected together at their upper ends by a cross member 61. The forward end of the loading device 50 may be provided with releasable hook bolt means 62 for connecting it with the press 35 by anchoring around two of the columns 38 on one side of the press. In Fig. 1 there is also shown an electrical control box 63 into which electrical conductors 64 from the limit switches along the rails 54 are connected. The operation of these circuits will be described later in section IV relating to the operation of this invention.

II-A. *Metering and filling mechanism*

Figure 2:
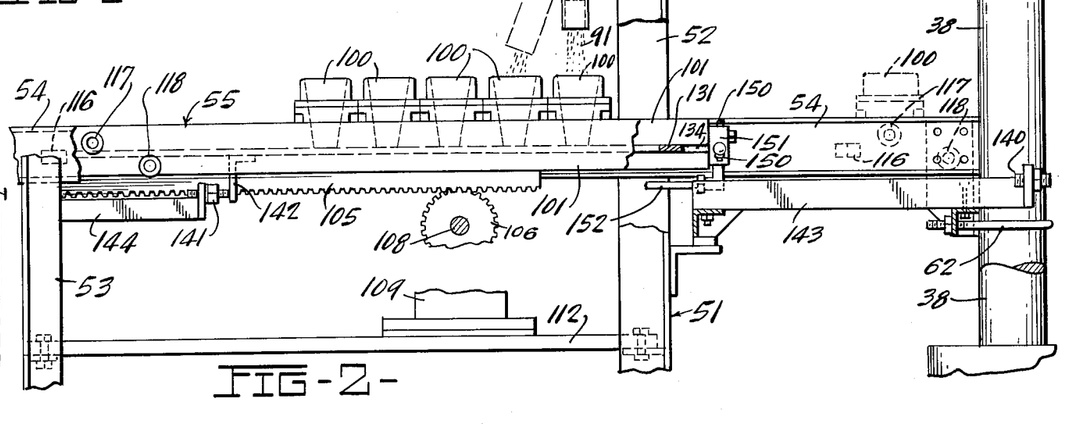
Fig. 2 is an enlarged side elevation with parts broken away of the loading device shown in Fig. 1 with the cups in the loading board in their first filling position below the device for metering the charges for the cups (which metering device is shown partly in section), the forward end of the loading board being shown in dotted lines in its position adjacent the press where it awaits for the press to open after having its cups all filled.
Figure 3:
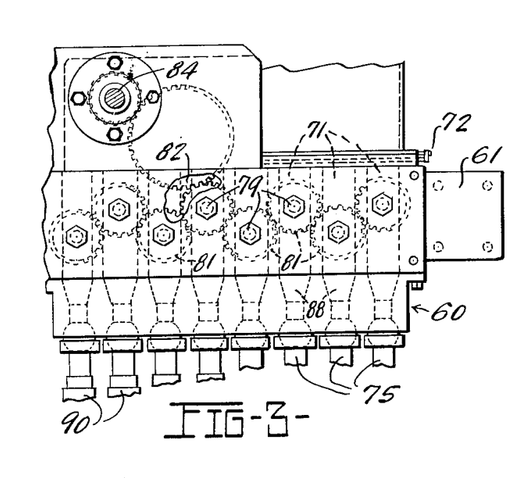
Fig. 3 is a left side elevation with parts broken away, of the metering device shown in Fig. 2.

Referring now specifically to Figs. 1, 2 and 3, the filling and metering mechanism 60 for the dry particles of powder or granular material employed for molding in the cavities 30, may be supplied from a hopper 70 mounted above the cross plate 61 and above the metering device. The hopper 70 may have tapered sides toward an elongated bottom which may be provided with a plurality of apertures aligned with each one of the row of ducts 71 (see Fig. 3). These apertures may be adjustably opened or closed by moving a sliding gate plate 72 containing a corresponding number of apertures. This gate 72 may be used to close all of these apertures in the event the hopper 70 is to be removed by unscrewing its mounting bolts 73, without having to empty the hopper 70 or spill any of the material which may remain therein.

Mounted below the hopper and in a row across the loading device 50 and behind the plate 61, may be mounted a plurality of metering devices, such as those shown in Hallenbeck U.S. Patent No. 2,627,086, issued February 3, 1953, or Hallenbeck et al. co-pending applications Serial No. 256,441, filed November 15, 1951, now Patent No. 2,781,546, or Serial No. 356,196, filed May 20, 1953, now abandoned, or other devices similar to the one disclosed in Figs. 2 and 3 of the present application. All such metering devices simultaneously meter predetermined quantities of powdered or granular material from a common hopper into a plurality of spouts 75 mounted below each of the metering chambers and aligned with the ducts 71. Each of the specific metering devices shown in Figs. 2 and 3 comprises an open ended pocket 76 in rotating sleeves 77 located transverse of each of the ducts 71 and completely filling and gating each of these ducts. The open end of the sleeve pockets 76 comprise an adjustable cylinder plug 78, which may be moved axially in the sleeve by adjusting the lock nuts 79 connected to a bolt 80 extending through the rotating sleeves to the plug 78. All of these metering sleeves 77 may be rotated simultaneously by gears 81 keyed to their sleeves and intermeshing with each other and a driving gear 82, which in turn may mesh through a gear reduction mechanism 83 with a motor shaft 84 which is governed to operate only sufficiently long each time it is energized to rotate the cylindrical sleeves 77 only through one complete rotation. The sleeves 77 thus are always rotated in the same direction and are not oscillated, in that this is an important factor in avoiding clogging of the sleeves 77. However, instead of the electric motor for driving the shaft 84 through a gear reduction mechanism 83, there may be provided a hydraulic cylinder and rack mechanism 86 as shown in Fig. 1, for operating the mechanism, but such a reciprocating mechanism should be attached so as to avoid oscillation of the sleeves 77.

The rotation of the adjustable metering pockets 76 in the sleeves 77 causes the material which fills the pockets from the hopper 70 when they are in the full line position shown in Fig. 2, to dump this material through the extensions 88 of the ducts 71, which connect with ball and socket joints 89 at the upper ends of the spout 75. These spouts 75 may be provided with telescopic sleeves 90 so as to prevent spilling of the powdered material 91 discharged therefrom into the cups 100 on the loading board 55, particularly when the alternate spouts are adjusted into the dotted line position 92 for simultaneously filling two rows of cups 100, as in a pattern similar to that shown in Fig. 4, instead of the compact pattern of cups as shown in Figs. 1 and 5.

II–B. *The loading board*

Figure 5:
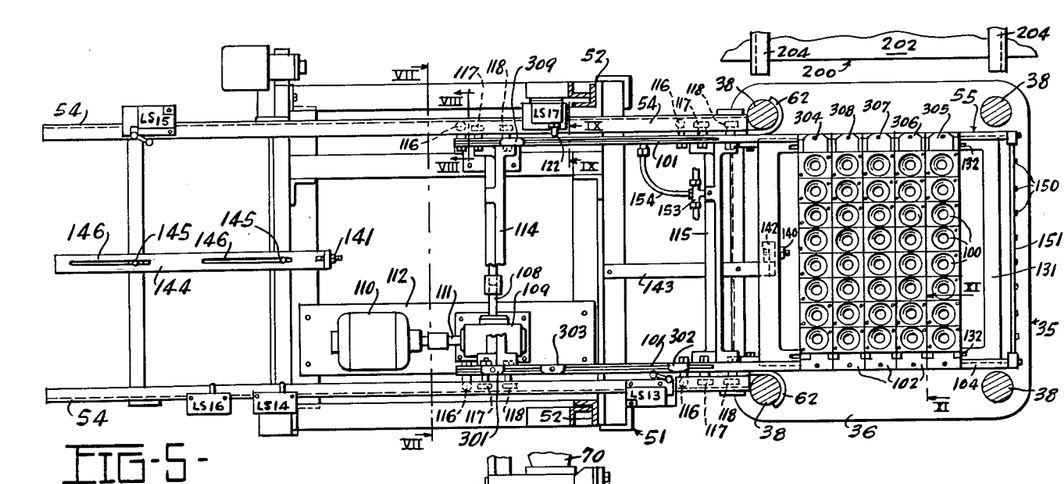
Fig. 5 is a reduced plan view of the loading apparatus shown in Figs. 1 and 2, with the filling and metering device removed, and the loading board shown in its cup discharging position in the press over the mold cavities.
Figure 6:
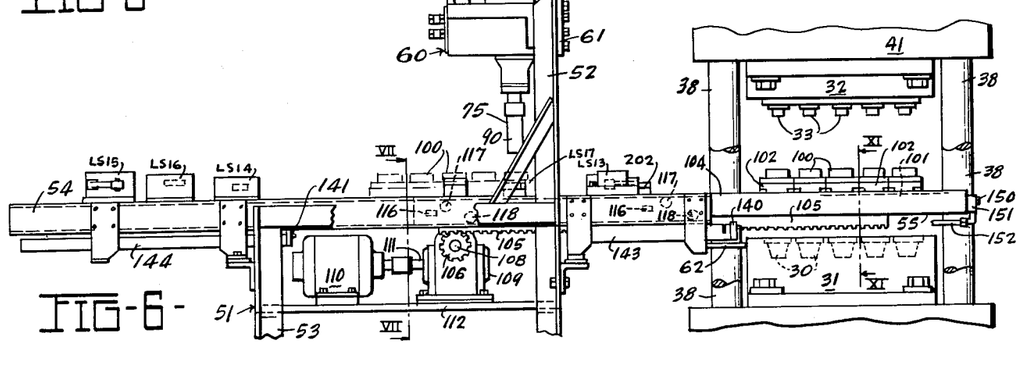
Fig. 6 is a side elevation of the loading mechanism shown in Fig. 5 showing part of the cup filling and metering device and the upper portion of the press.

Referring now more specifically to Figs. 5 and 6, the loading board 55 comprises a reciprocating frame comprising parallel side members 101 across one end of which may be mounted a plurality of cup row frames 102 into which row frames of individually adjustable cups 100 are mounted. Along the bottom edges of each of the members 101 may be mounted toothed rack 105 which meshes with the pinion gears 106 (see also Fig. 7) mounted at the ends of a rotating shaft 108 driven through gear reduction box 109 connected to an electric motor 110 by means of shaft 111. The motor 110 and gear box 109 may be mounted on a plate 112 attached between the legs 52 and 53 of the frame 51 beneath the rails 54.

Figures 7, 8, 9, 10, 11, 13, 14:
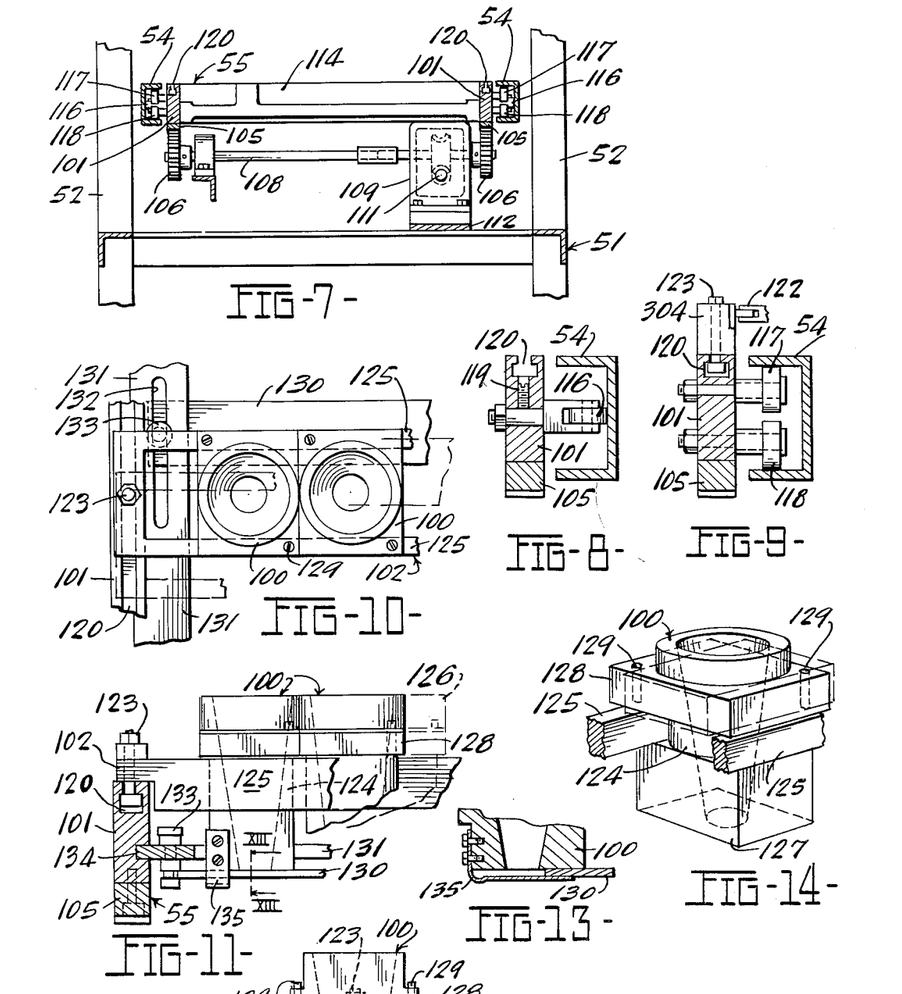
Fig. 7 is an enlarged vertical sectional view taken along line VII—VII of Figs. 5 and 6, showing the driving mechanism and guides for the reciprocating motion of the loading board.
Fig. 8 is an enlarged vertical sectional view taken along line VIII—VIII of Fig. 5 showing the rail and one of the guides for one side of the loading board.
Fig. 9 is an enlarged vertical sectional view taken along line IX—IX of Fig. 5 showing the other guides in the rail for the loading board and one of the adjustable cams co-operating with the lever of a limit switch.
Fig. 10 is a further enlarged plan view of one end of a row of cups on the loading device shown in Figs. 1, 2 and 5.
Fig. 11 is a vertical section taken along line XI—XI of Figs. 5 or 6, or a side elevation of the cups shown in Fig. 10 with parts being broken away.
Fig. 13 is a vertical sectional view taken above the line XIII—XIII of Fig. 11 showing the lower end of one of the cups similar to that shown in Fig. 12, but with the bottom discharge gate in its open position.
Fig. 14 is a perspective view of one of the cups shown in Figs. 10, 11 and 12 clamped in position between the parallel frame members of one of the row of cups on the loading board.

Between the rearwardly extending parallel side members 101 of the reciprocating loading board frame may be transverse bracing members 114 and 115 at the ends of each of which may be provided a set of three guide rollers which co-operate with U-shaped channel rails 54. A set of these guide rollers are shown in more detail in Figs. 8 and 9, and comprise a vertical rail face engaging roller 116 as shown in Fig. 8, and a pair of offset horizontal rail flange engaging rollers 117 and 118 as shown in Fig. 9. Each of these rollers may be mounted on bolts for adjustment in the frame members 101, and in Fig. 8 this bolt mounting may be fixed from rotation by means of a set screw 119, if desired.

The upper edges of the two parallel loading board frame members 101 may be formed with flanged grooves or channels 120 throughout their full length, along which channels may be adjustably mounted the limit switch operating cams 301 through 309, and as shown in Fig. 9 the cam 304 cooperating with the lever arm 122 of the limit switch LS17, which switch may be mounted on one of the rails 54. The ends of the row frames 102 also are adjustably mounted along these channels 120, as shown more specifically in Figs. 10 and 11. The adjustable connections to the channels 120 may be by means of bolts 123 whose heads may be fitted below the flanges of the channel 120 and upon whose upper ends nuts may be readily attached and tightened for clamping the parts to the members 101. These bolts 123 may have elongated heads, so that when turned at 90° to their positions shown in Figs. 9 and 11, they may then slip through the narrow neck of the slot 120 for removal without being slid out through the ends of the channels 120.

II–C. *The cups*

Referring now more specifically to Figs. 10 through 14 there are disclosed the individual cups which may be mounted in parallel row frames 102 between the loading board side members 101. These row frames 102 comprise a long rectangular central slot with parallel side bars 125 between which the individual cups 100 may be fitted and slide longitudinally. The cups 100 may be inserted or removed from the frames 102 by rotating the cups 90° from their full line positions shown in Figs. 2, 4, 5, 6 and 10 through 14, into the dotted line positions 126 shown in Figs. 4 and 11, to align the longer sides of the lower block portions 127 of the cups 100 lengthwise between the bars 125, so the portions 127 may pass between the bars 125. The central portions 124 of the cups 100 between the rectangular upper and lower portions 127 and 128 are preferably cylindrical so as to easily permit this rotation of the cups between the bars 125. When the cups 100 are rotated into the full line positions such as shown in Figs. 10, 11, 12 and 14, their wider and overhanging upper portions 128 ride on opposite upper edges of the bars 125, and these portions 128 may be provided with set screws 129 at opposite corners thereof for clamping the cups 100 to the bars 125 between the ends of the set screws 129 in the overhanging or elongated ends of the lower portions 127.

Figure 4:
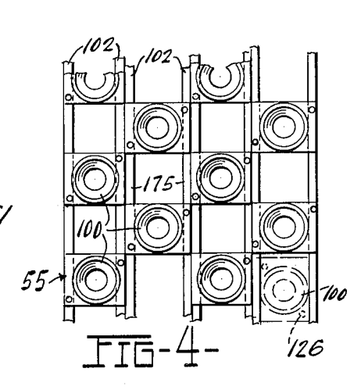
Fig. 4 is plan view of another pattern for the rows of cups on the loading board from that shown in Fig. 1 to illustrate the adjustability of the apparatus of this invention; one of the cups in the lower right corner being shown in dotted lines and turned at right angles to the other cups illustrating how the cups may be removed or inserted into a row.

Each of these cups 100 are similar and separate so they may be arranged in any numbers in any row to form different patterns, such as shown in Fig. 4 as distinguished from that pattern shown in Figs. 1 and 5. The rows also may be spaced by sliding their ends in the grooves 120 along the frame members 101. Thus, a wide variety and configurations of repetitive patterns of one, two, or more rows of cups may be produced on loading board 55 to conform with a corresponding configuration or pattern of cavities 30 in a mold block 31 in a press.

These individual cups 100 may also be provided with sliding bottom closure gates 130 (see Figs. 10, 11, 12 and 13) which closure gates may comprise strips which extend transversely across a slidable rectangular frame 131 (see Figs. 2, 5, 10 and 11) and are adjustable with the rows 102 in the slots 132 provided along the edges of the frame 131 such as by means of bolts 133. This frame 131 may be mounted in parallel grooves 134 (see Fig. 11) on the inside of each of the loading board frame members 101 for sliding longitudinally and relatively of the loader board and its cups 100, so that the closing gate strips 130 may move from the gate closed position shown in Fig. 12 to the gate open position shown in Fig. 13. Spring clips 135 (see Figs. 11, 12 and 13) may be mounted below the bottom edges of some or all of the cups 100 for guiding and maintaining the gate strips 130 into intimate closing contact with the bottoms of the cups 100, within the frame 101 of the loading board.

The operation of the gate strips 130 mounted in the frame 131 may be effected by adjustable stops 140 and 141 (see Figs. 2 and 5) mounted on the device supporting frame 51, which stops co-operate with an abutment 142 depending from and attached to the slidable gate frame 131. The adjustable screw and lock nut stop 140 at the front end of the loading device 50 may be mounted on extension member 143, so as to extend sufficiently forward with respect to the cavities 30 in the press 35, so that the abutment 142 on the rear of the gate frame 131 will only stop the motion of the frame 131 relative to the continued driving motion of the loading board carrying the cups, when the cups are over their respective cavities 30 in the mold or platen 31. Thus by stopping the gate frame 131, the gate strips 130 remain in the position shown in Fig. 13, while the cups travel on inwardly toward the press so their bottoms are opened as is also shown in Fig. 13.

Figure 12:
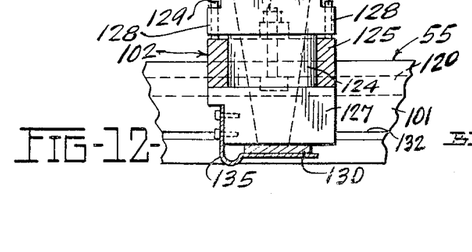
Fig. 12 is a right end elevation of the row of cups shown in Figs. 10 and 11 with the bottom discharge gate for the cups in its closed position.

These cups 100 remain with their gates 130 open until the loading board 55 is retracted completely from the press and the abutment 142 hits the other back rest adjustable stop 141 at its other limit of travel of the loading board 55, where the gates 130 are then closed into the position shown in Fig. 12, which closing occurs just before the motion of the loading board 55 is stopped and reversed to move forward again to its filling position, shown in dotted lines in Fig. 6. The member 144 upon which the stop 141 is mounted may be further adjusted longitudinally by bolts 145 mounted in slots 146 in the member 144.

If desired, the front or forward end of the loading board 55 may be provided with a set of air jets or nozzles 150 (see Figs. 1, 2, 5 and 6) which may be connected through ducts 151 and a manifold 151 and ducts 152 to a fitting 153 on the cross member 115 of the loading board 55, and thence through a flexible duct 154 to a source of air pressure. These jets 150 may be arranged to blow not only forwardly but also upwardly and downwardly for cleaning each of the cavities 30 and the co-operating mold projections 33 of the platens 31 and 32, respectively, so that a clean mold will be provided before each fresh batch of moldable material is deposited therein from the cups 100 in the loading board 55, just before the board reaches its cavity filling position shown in full lines in Figs. 5 and 6.

III. THE UNLOADING DEVICE

Figure 15:
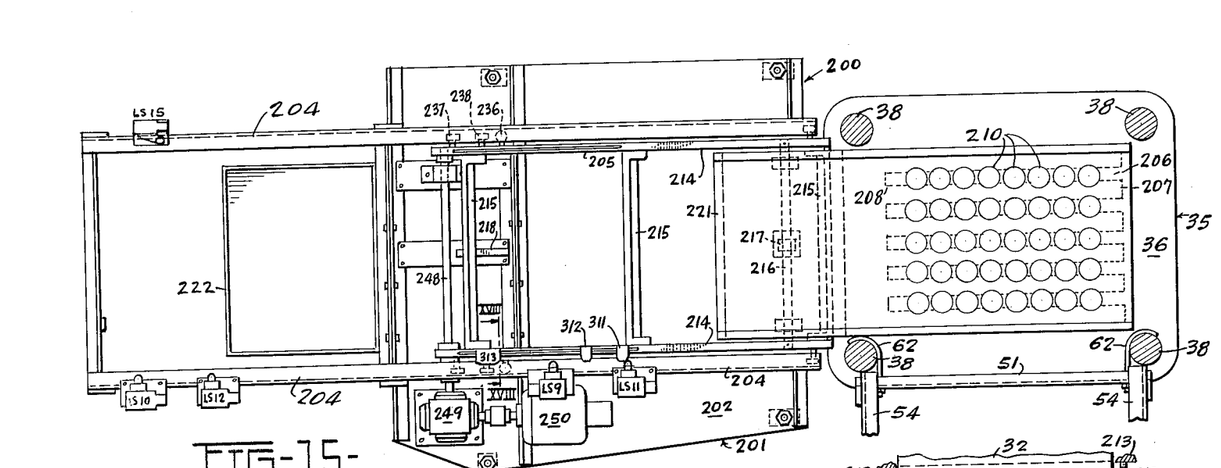
Fig. 15 is a plan view of an embodiment of an unloading device of this invention in its forward position in a press, similar to that shown in dotted lines in Fig. 1, with dotted comb teeth shown in the plate to show how it can be adapted for a bottom ejection press.
Figures 16, 17, 18:
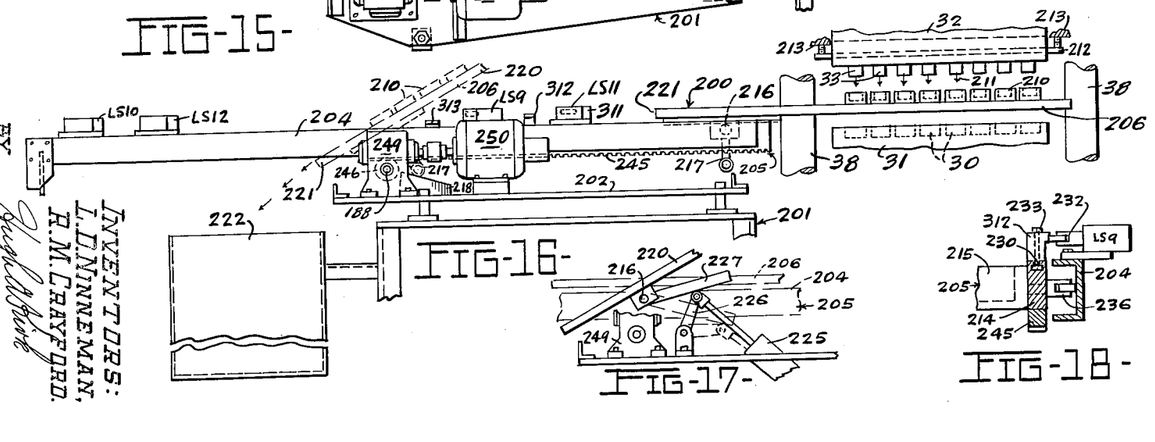
Fig. 16 is a side elevation of the unloading device shown in Fig. 15, with a part of a top ejection system for the upper platen of the press, and showing the molded pieces or articles deposited on the unloader plate; and in dotted lines showing the unloading plate tilted as a chute for dumping the articles in a container away from the press.
Fig. 17 is a side elevation of a hydraulic dumping or tilting mechanism for the unloading board which may be employed instead of the mechanical ramp and cam dumping mechanism shown in Fig. 16.
Fig. 18 discloses an enlarged vertical section taken along line XVIII—XVIII of Fig. 15 showing a guide rail, one side of the unloading plate, and a co-operating adjustable cam and limit switch thereon.

Reference is now made specifically to Figs. 15 and 16 of the unloading device 200, although parts thereof may also be seen in Figs. 1 and 5. Since the unloading device 200 is independent from the operation of the loading device 50, is not operated directly thereby, but only by the operation or position of the press 35, such as through electric limit switches, the unloading device 200 may be mounted and reciprocated at right angles to the reciprocating motion in the loading device 50, thus freeing two adjacent sides of the press 35 for easy access and resetting of the platens 31 and 32 in the press.

The unloading device 200 is shown here to be mounted on a separate frame or table 201 upon the top of which table is provided a platform 202 onto which may be mounted a pair of parallel horizontal guide rails 204 for reciprocally guiding a frame 205 for unloading board to which is pivotally mounted a tiltable chute and tray 206 or a chute and comb plate 207 (that is, a plate 206 with notches 208 (shown in dotted lines) therein forming a comb 207), which plate 206 or 207 receives the molded pieces or objects 210 (see Fig. 16) which may be ejected from the upper platen 32 of the press 35 by means of special ejecting pins 211 simultaneously operated by a member 212 contacting stops 213 (or being operated hydraulically, not shown) to deposit the particles 210 from the top ejection system shown in Fig. 16, onto the tray-plate 206, which is now extended into the press between the platens 31 and 32.

The unloading frame 205 may comprise a pair of parallel rail members 214 connected by three transverse members 215, and journalling in the forward end thereof a transverse shaft 216 on which the rearward end of the plate 206 or 207 is pivoted. Extending downwardly from the shaft 216 and mounted on the bottom side of the plate 206 or 207 may be a lever arm 217 which, when the board is in its retracted or rearward position, contacts an inclined cam surface 218 mounted on the table 202 to tilt the plate 206 or 207 into its dotted line position 220, so that the articles 210 thereon will slide off the rear edge 221 of the plate 206 or 207 into a container 222, remote from the press 35 without having to re-engage the articles 210 by additional moving means.

If desired, instead of the mechanical lever 217 and ramp 218, the unloading plate or comb 206 or 207 may be tilted into the position 220 by means of a hydraulic piston 225 as shown in Fig. 17, whose piston connected to a lever 226 operates against a cam lever 227 adjustably fixed to the underside of the plate 206 or 207 in place of the lever 217 shown in Fig. 16. The hydraulic cylinder 225 may be operated through a limit switch (not shown).

A channel groove 230 may be provided along the upper edges of the side members 214 of the unloading board 205 for adjustably mounting limit switch operating cams 311, 312 and 313. In Fig. 18 the cam 312 is shown as well as its adjustably mounting bolts 233 (similar to bolts 123 in Fig. 9) and how this cam 312 operates the lever 232 of limits switches LS9 that may be mounted on one of the rails 204.

The guiding of the parallel frame members 214 of the unloading frame 205 may be accomplished by guide rollers similar to those shown in Figs. 8 and 9, one of which 236 (similar to roller 116) is shown in Fig. 18, with the other rolls 237 and 238 being shown in dotted lines in Fig. 15 that correspond to the pairs of rollers 117 and 118 shown in Fig. 9.

On the under side of each of the parallel side frame members 214 of the unloading frame 205, there may be mounted toothed racks 245, which may co-operate with driven pinion gears 246 mounted on a transverse shaft 248 connected to a gear reduction box 249 driven by a reversible electric motor 250. This motor 250 may be energized and controlled according to the four limit switches LS9, LS10, LS11 and LS12 mounted on the stationary rail 204, which co-operate with the cams 311, 312 and 313 adjustably mounted on the corresponding reciprocating unloading device frame members 214.

IV. OPERATION

IV–A. *Loading device operation*

Figure 19:
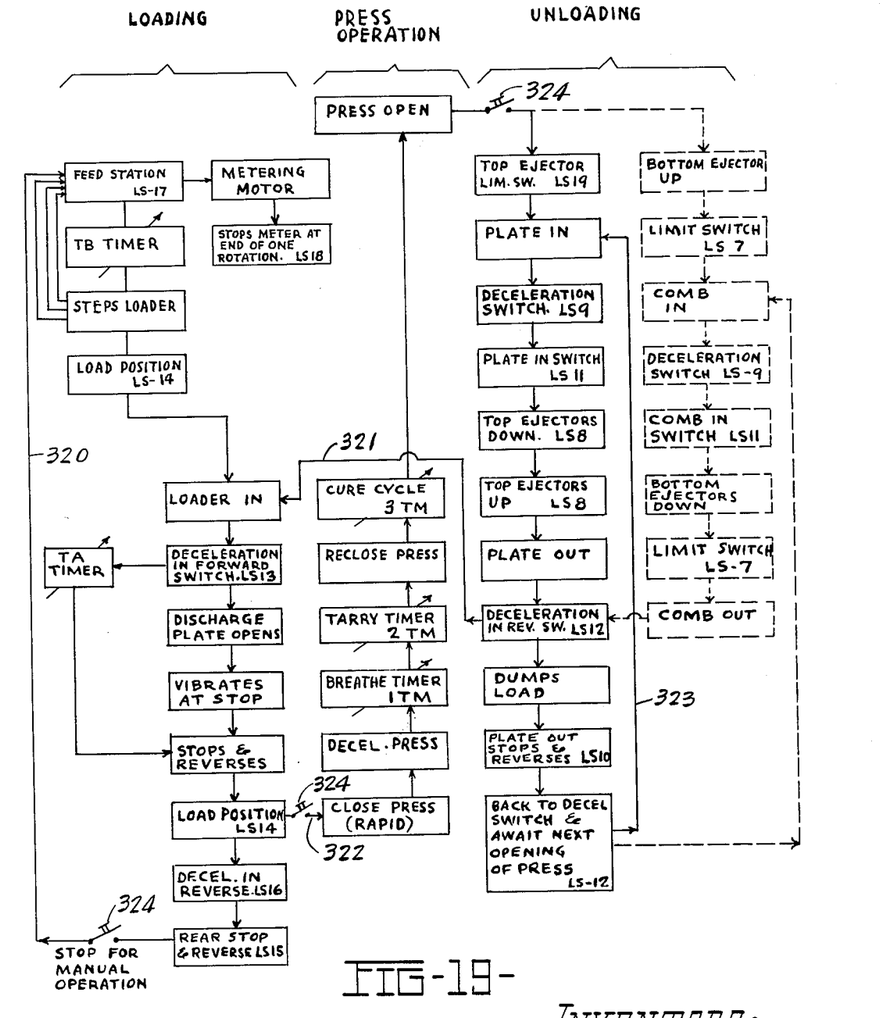
Fig. 19 is a flow sheet block-diagram of the operations of the loading and unloading devices according to this invention in co-operation with the steps of operation of a thermosetting plastic press having a breathing cycle and a top ejection system; and in dotted lines the operations in blocks for a bottom ejection system on the same press.

Referring now to Fig. 19, assume that the loading and unloading devices of this invention are fully automatic and controlled by the operation of an automatic hydraulic molding press, and that this molding press has just closed after the loading device has filled all of the cavities 30 in the mold thereof and the loading board 55 has retracted to its rearward limited position. In this position the cam 304 (see Fig. 5) operates the rear stop and reverse limit switch LS15 to reverse the loading board driving motor 110 which then drives the loading board 55 forward again until the cam 305 at the end of the first forward row of cups 100 operates the feed station limit switch LS17. According to Fig. 19, these operations are schematically illustrated from the bottom block LS 15 upwardly along the left side line 320 to the top block LS17.

The first operation of the feed station limit switch LS17 stops the motor 110, starts the metering motor (not shown) connected to the shaft 84, and start a timer TB which prevents the loading board driving motor 110 from starting again for a sufficient length of time so that the metering motor can make one rotation of the metering sleeves 77, plus a delay sufficient to permit all of the granular material metered to drop by gravity through the ducts 71, 88 and sputs 75 into the first one or more rows of cups 100 which are to be filled in the first feed position of the load board 66. After the timer TB has expired, it starts the motor 110 to move the loading board 55 forward until the next cam 306 on the second row, or set of similarly arranged rows of a repetitive pattern of cups, operates the limit switch LS17 again and repeats the same operations for filling the second row of cups 100 by causing the metering motor to make another rotation and start again the timer TB. At the second expiration of the timer TB, the driving motor 110 is started again to step the loading board 55 to the next row of cups to be filled controlled by the cam 307 operating the switch LS17 again, and so on for each of the rows or group of rows which make up the repetitive pattern of cups corresponding to the pattern of cavities 30 of the mold to be filled in the press 35.

After the cam 309 for the last row of cups (as shown in Fig. 5) has operated the limit switch LS17, and the timer TB instigated thereby has expired for the last time this cycle, the loading board 55 is driven forward into its load position, as shown in Fig. 1, to await the opening of the press 35. This load position is determined by the location of cam 303 (shown in Fig. 5), on the rail 54 which operates the limit switch LS14 to stop the driving motor 110 which then is not started again until the press 35 has been opened and it has been unloaded, and the unloading device 200 is completely outside of the press determined by its cam 312 operating its rearward deceleration limit switch LS12 shown in Fig. 15.

Now assuming that all this has occurred, and an impulse or indication has been obtained over connection or conductor 321 shown in Fig. 19 from the limit switch LS12, the motor 110 is started again to move the loading board 55 into the press to the full line position shown in Figs. 5 and 6. At the time that the motor 110 is thus started, a separate solenoid valve (not shown) may permit compressed air to enter the ducts 154, 153, 152 and 151 to blow streams of air through the jets or nozzles 150 at the front end of the board, to blow out and clean off the mold and cavities 30 as the loading board 55 travels inwardly between the open platens 31 and 32.

Since the rate of travel of the board is as fast as possible so as to reduce the cycle time of the operation of the press as much as possible, it is necessary that its speed be decelerated before it reaches its final in or forward position, so that the material in the cups 100 will not be thrown therefrom and spill outside of the cavities 30 of the mold. Accordingly, before the loader board 55 reaches the full line position shown in Figs. 5 and 6, cam 302 thereon operates the in or forward deceleration limit switch LS13 to start another timer TA, to reduce the speed of the motor 110 before the stop 142 on the frame 151 contacts the stop 140 to open the gates 130 beneath the cups 100. The timer TA is of sufficient duration to continue the slow speed energization of the motor 110 for a longer time than it takes the loading board 55 at its decelerated speed to reach the forward end of its travel and be stopped mechanically by the stop 140, so that the still energized motor 110 will pulsate, vibrate or jerk the board for a few seconds to insure that all of the material in the cups 100 is shaken therefrom into the mold cavities 30.

The time for this shaking or vibration may be determined by a rheostat on the timer TA, which timer may be located with the timer TB in the box 63 shown in Fig. 1. These timers may be conventional fluid or electronic timers similar to that disclosed in U.S. Patent No. 2,171,347.

The vibration or shaking of the loading board 55 against the stop 140 may be accomplished by applying separate successive pulses of current to the reversible D.C. motor 110, with the amount of its deceleration being determined by the duration, size and/or repetition rate of the pulses. These pulses may be controlled in an electronic circuit connected to a halfwave rectifier.

The expiration of the timer TA, after the loading board 55 has been vibrated against its stop 140 with the gates 130 at the bottom of the cups 100 open, stops and reverses the driving motor 110 to withdraw the loading board 55 from the press 35 back into its rearwardmost position. In the retraction of the loading board its cam 303 operates the load position limit switch LS14 which may be connected to start the closing operation of the press 35 for its next molding cycle, since this is the first limit switch contacted when the loading board 55 is completely removed from the press. The rearward movement of the loading board 55 continues until the cam 301 (which may be on a different vertical level from the cam 303 to prevent interference with the between limit switches LS14 and LS16) operates the rearward deceleration limit switch LS16 to slow down the motor 110 before it reaches the end of its travel and the abutment 142 on the slidable frame 151 contacts the stop 141 to move the gate bars 130 to close all the cups 100. After the cups 100 are closed, the cam 304 operates the rear stop and reverse limit switch LS15 to stop and reverse the motor 110 and start the loading board 55 forward again until the cam 305 starts the cup filling cycle which is the place where the description of operation in this section IV–A started.

IV–B. *Press operation*

The load position switch LS14, operated on the retraction or withdrawal of the loading board 55 from the press 35 as soon as it is clear of the press, may electrically connect the control for the press 35 to start it to close rapidly by lowering the platen 32 toward the platen 31 which is shown by the connection 322 in Fig. 19. The press may, near the end of its travel, decelerate its speed and/or just before it closes, instigate a breather timer 1TM which causes the press to open slightly after the material in the molds has been pressed for a short time before curing, and then remain open by operating a tarry timer 2TM before reclosing the press under high pressure and operating a cure cycle timer 3TM. The cure cycle timer 3TM operates for a sufficient time for molding the plastic material which has been filled into the cavities 30 into the units desired. During these breathing and curing times, the cups 100 in the loading board 55 are being filled as described in the section IV–A above. When the cycle timer 3TM has expired, a control circuit is instigated to open the press.

The operation of the press however may be varied without departing from the scope of this invention by eliminating the breathing timer and/or the delay which is caused by the tarry timer 2TM, or the press may be operated so that high, low or no pressure may be applied before the breathing cycle. If desired, the press also may include a safety device such as that disclosed in Ninneman co-pending application Serial No. 598,136, filed July 17, 1956, now Patent No. 2,923,973. All of these controls for the press however may be adjusted by cams and/or limit switches placed to co-operate with the movement of the upper platen 32 or piston, which cams or switches may be mounted on the side of the press, or on separate parallel controller rods which move up and down with the platen 32 along which the cams are adjustably mounted to co-operate with limit switches in an adjacent control box. These features are well known in the art of automatic plastic presses, and do not comprise a part of the invention herein except that the press open limit switch may be automatically tied in for starting the operation of the unloading device 200 described in the following section IV–C.

IV-C. *Unloading device operation*

The description of the operation of unloading of the press will first be described as shown according to the block diagram shown in full lines for a top ejector system on the press 35 as shown in more detail in Fig. 16, in which the molded articles 210 are retained on the platen 32 as they are removed from the cavities 30 in the lower platen 31, and then ejected therefrom by separate ejecting pins 211 as shown in Fig. 16. Following the diagram in Fig. 19, as soon as the press has opened and platens 31 and 32 have completely separated, a top ejector limit switch LS19 (not shown) may be operated to start the motor 250 for driving the unloading device 200 to the position shown in Figs. 15 and 16, and in dotted lines in Fig. 1.

It is assumed that before the plate 206 is moved inwardly, it is in a partly forward position, namely away from its rear stop and reverse limit switch LS10, but instead is awaiting at its rearward deceleration limit switch LS12, in which position the tiltable plate 206 of the unloading device is in its horizontal position and its forward edge is just outside of the press 35.

Since the rate of movement of the unloading board 205 also is rapid, it is desirable that before it reaches the forward or in-position shown in Figs. 15 and 16, that the deceleration cam 312 mounted on one of the frame members 214 operates a forward deceleration limit switch LS9 to decelerate the speed of the motor 250 to prevent abrupt stopping of the plate 206 when its cam 311 operates the forward or plate-in limit switch LS11. The cams 311 and 312 may be at different vertical levels so that one cam will not operate the other cam's limit switch, and vise versa.

As soon as the plate-in limit switch LS11 is operated, the motor is stopped and the top ejector may be operated to descend and operate its down limit switch LS8 of the press, to move the bar 212 shown in Fig. 16 downwardly to discharge all of the molded articles or pieces 210 onto the top of the plate or tray 206. When the top ejectors 211 have reached their down limit they are returned to operate again their limit switch LS8 which may reverse and energize the motor 250 to move the unloading board 205 out of the press at a rapid rate until its cam 313 contacts the rear deceleration limit switch LS12 to decelerate the motor 250, which occurs just before the mechanical tilting cam 217 reaches the fixed inclined plane 218 on the table 202 to tilt the tray or plate 206 into the dotted line position 220 so that the plate 206 acts as a chute to slide all of the pieces 210 into a container 222 or onto a conveyor, or the like, as desired. The reduced speed of motion of the unloading plate towards the rear continues until the cam 313 operates the rear stop and reversing limit switch LS10, which occurs after all the articles 210 have been dumped from the rear edge 221 of the plate 206 or 207. The motor 250 is then reversed and the plate 206 or 207 is tilted back into its horizontal position where its cam 313 operates the rear deceleration limit switch LS12 to stop the motor 250 and await until the next cycle of operation of the press 35 operates its top ejector limit switch LS19 to again start the motor 250, which connection is illustrated by the connection line 323 in Fig. 19.

As previously stated, as soon as the unloading board 205 starts to tilt into position 220 by operation of the rearward deceleration limit switch LS12, a signal is sent via conductor 321 (shown in the diagram of Fig. 19) to start the loading device 50 by starting its motor 110 to drive the loading board 55 into the press, as described above in section IV-A.

In the event the hydraulic means 225 shown in Fig. 17 is employed for dumping or tilting the unloading chute-plate 206 or 207 into the position 220, the operation of the hydraulic piston thereof may not be operated until the rear limit switch LS10 is contacted by the cam 313, so as to prevent further rearward movement of the board while it is being tilted under the operation of the piston of the hydraulic means 225 operating against the cam 227.

In the event that a comb plate 207, such as shown in dotted lines in Fig. 15, is employed for a bottom ejecting system on a press, the block diagram sequence shown in full lines in Fig. 19 between the "press open" block and the "deceleration rear switch LS12" block, is replaced by the dotted line blocks to the right thereof, in which the following sequence of operation occurs: the opening of the press immediately initiates the bottom ejector pins (not shown, but similar to the top ejector pins 151, but moving upwardly from the cavities 30 in the platen 31), to move upwardly, operating a limit switch LS7 (similar to LS8 mentioned above), and so that the molded particles 210 will follow against the molding members 33 as the platens separate. As soon as the particles 210 have been lifted by the bottom ejector pins clear of the top of the lower platen 31, the comb plate 207 is inserted so that the grooves or slits forming the teeth in the comb plate straddle the bottom ejector pins under the articles 210 which are resting on top of the pins. The comb plate 207 moves in similarly to the tray-plate 206, first contacting its forward deceleration switch LS9, and then its final in limit switch LS11, which switch operates to retract downwardly the bottom ejector pins to strip the articles 210 off on to the comb plate 207. When the bottom ejectors have completely retracted below the cavities 30 in the lower platen 31, the limit switch LS7 is operated again to reverse and start the motor 250 to withdraw the comb plate 207 from the press. When the unloading board 205 with the comb plate 207 contacts the rear deceleration limit switch LS12, the comb plate is tilted to act as a chute and dump all of the articles 210 thereon away from the press, and then continue its operation the same as that for the plate 206 for the top ejection system.

If desired, both top and bottom ejection systems may be employed on a press to insure that all of the particles in the mold are always properly suspended above the plate 206 or 207 before it is moved into the press between the platens 31 and 32. Thus, for top ejection there may be provided bottom follow-up pins to insure the articles 210 being retained on the members 33 before they are stripped therefrom by the pins 211, which bottom follow-up pins must be retracted before the plate 206 is introduced; and similarly in a bottom ejection system there may be top hold-down pins, like pins 211, which hold the pieces 210 against the tops of the upwardly moving bottom ejection pins, to prevent the pieces 210 from falling off the bottom ejection pins into the mold and being lost or contaminating the mold. The operation of such additional devices are known in the art and are part of the operation of the hydraulic press itself and not part of the unloading and loading device of this invention, except that they may be synchronized with or aid in synchronizing the operation of the loading and unloading devices of the apparatus of this invention.

As previously stated, the loading and unloading apparatus of this invention is not limited to the loading and unloading of dry plastic granular material for plastic presses, but also may be used for any other dry powder or particles of material which are to be fed simultaneously into cavities, whether in molds or not, in a given repetitive pattern. The loading device 50 of this invention may be employed without the unloading device 200, or vice versa, and each of the devices and press may be independently, manually or semi-automatically controlled as illustrated by the switches 324 in the connections in Fig. 19.

While there is described above the principles of this invention in connection with specific apparatus, it is to be clearly understood that this description is made only by way of example and not as a limitation to the scope of this invention.

What is claimed is:

1. A method of simultaneously feeding a plurality of quantities of material particles into a corresponding plurality of pre-arranged cavities, comprising: dividing said plurality of cavities into equal pluralities of adjacent identical pattern groups, measuring simultaneously a plurality of quantities of said material corresponding to one of said groups, collecting said plurality of said measured quantities of said material particles corresponding to one of said pattern groups, stepping said pattern groups for measuring another of said plurality of quantities and for collecting said another plurality of quantities into the next of said identical pattern groups adjacent said one of said pattern groups until collections are made in all of said pattern groups, simultaneously moving all of said collected groups of measured material particles over said cavities, simultaneously discharging all of said groups of quantities of material particles into said cavities, and returning said groups for successively collecting another corresponding plurality of quantities of material.

2. A method according to claim 1 including decelerating the motion of said groups as they approach alignment with said cavities.

3. A method according to claim 1 including simultaneously unloading all of said cavities of the objects formed in them, and removing said objects to a point remote from said cavities.

4. A method according to claim 1 including vibrating said groups to insure complete discharge of said particles therefrom.

5. An arrangement of a plurality of bottom dischargeable cups comprising: a plurality of individually adjustable and removable cups, a plurality of minor frames each comprising a pair of parallel bars between which bars said cups may be positioned, means on each cup for adjustably attaching it to said bars, a major frame in which said minor frames may be positioned, means for adjustably attaching said minor frames to said major frame, a third frame movable relative to said other frames and cups and mounted on said major frame, and adjustable gate means attached to said third frame for closing and opening the bottom of all of said cups.

6. An arrangement according to claim 5 including guide means mounted on at least some of said cups for guiding said gate means.

7. A universal loading device for feeding a plurality of separate measured quantities of material particles into a pattern of cavities, comprising: means for metering a plurality of quantities of said material, an arrangement of a corresponding plurality of individually adjustable cups positioned according to said pattern of said cavities, means for filling said pattern of cups with said metered material, means for discharging said cups into said corresponding pattern of cavities, means for reciprocating said arrangement between said filling means and said discharging means, and a stop for limiting one of said reciprocations of said arrangement, said discharging means including a vibrating means comprising a device for producing pulsating current and an electric motor energized by said pulsating current to vibrate said arrangement against said stop.

8. A device according to claim 7 including a timer for limiting the duration for vibrating said arrangement.

9. A universal loading device for feeding a plurality of separate measured quantities of material particles into a pattern of cavities arranged in a plurality of similar rows, comprising: means for metering a plurality of quantities of said material, a movable arrangement of a corresponding plurality of cups positioned in row frames according to said pattern of said cavities, means for filling said cups with said metered material comprising means for stepping said arrangement for filling adjacent similar row patterns thereof successively, means for discharging said cups into said corresponding pattern of cavities, and means for moving said arrangement between filling and discharging positions.

10. A universal loading device for feeding a plurality of separate measured quantities of material particles into a pattern of cavities, said pattern comprised of repeated sub-patterns comprised of at least one row of said cavities, comprising: means fixed relative to said device remote from said cavities for metering a plurality of quantities of said material, a movable arrangement of a corresponding plurality of individual fixed volume cups adjustably positioned according to said pattern of said cavities, means for filling said cups with said previously metered material, means for stepping said arrangement for filling adjacent similar sub-patterns thereof successively, means for simultaneously discharging said cups into said corresponding pattern of cavities, and means for moving said arrangement of said cups between the metering and filling location and the discharging location.

11. A universal loading device for feeding a plurality of separate measured quantities of material particles in a pattern of cavities in one position, comprising: a movable arrangement of a corresponding plurality of cups located according to said pattern of cavities, means independent of said arrangement in another position for metering a plurality of material particles for said cups, means for reciprocating said arrangement between said positions, means in said other position for discharging said metered material from said metering means into said cups, and means in said one position for discharging said cups into said corresponding pattern of cavities.

12. A device according to claim 11 wherein said means for metering said material comprises a plurality of simultaneously operating individually adjustable metering devices.

13. A device according to claim 11 including adjustable cam and cam operated means for controlling said reciprocating means, and wherein said cups are arranged in adjustable frames associated with said cam means whereby adjustment of said frames corresponds to the adjustment of said reciprocating means.

14. A device according to claim 11 wherein said discharging means comprises gate means operated by the reciprocating movement of said arrangement to simultaneously discharge all of said cups into said cavities.

15. A universal loading device for feeding a plurality of separate measured quantities of material into a repetitive pattern of cavities, comprising: separate means for simultaneously metering a plurality of quantities of material, a reciprocating board of a corresponding plurality of separate cups positioned in repeated groups forming said repetitive pattern, means for successively filling adjacent repeated groups of said patterns of said cups with said metered material, means for filling at least one of said cups with metered material from a plurality of said metering and said filling means, and means for discharging simultaneously all of said cups on said board into said corresponding pattern of cavities.

16. A universal loading device for feeding a plurality of separate measured quantities of material into a repetitive pattern of cavities, comprising: separate means for simultaneously metering a plurality of quantities of said material in one position, a reciprocating board of a corresponding plurality of separate cups adjustably positioned according to said pattern of repetitive groups of cavities, a plurality of repetitive frame means on said board for adjustably supporting groups of said cups corresponding to said groups of cavities, means for successively filling said groups of cups in adjacent frame means with said metered material, means for discharging simultaneously all of said cups on said board into said corresponding pattern of cavities in another position, and controllable means for reciprocating said board between said positions.

17. An assembly of individual cups for mounting between a pair of parallel bars comprising: a rack of parallel bars and a plurality of cups, said cups comprising: a conical chamber having a cylindrical outer portion located and rotatable between said bars, oppositely outwardly projecting portions on each of said cups above and below said cylindrical portions for straddling said bars and forming guide spaces for sliding said cups along said bars when said projecting portions are transverse of said bars and for removing said cups from between said bars when said cups are rotated so that said projecting portions are away from straddling said bars, and set screw means in at least one of said projecting portions for clamping said cup from sliding and rotating between said bars.

References Cited in the file of this patent
UNITED STATES PATENTS

| Number | Name | Date |
|---|---|---|
| 250,500 | Chewning | Dec. 6, 1881 |
| 594,630 | Lindsay | Nov. 30, 1897 |
| 622,483 | Jackson | Apr. 4, 1899 |
| 648,006 | Warren | Apr. 24, 1900 |
| 767,872 | Davies | Aug. 16, 1904 |
| 846,169 | Valerius | Mar. 5, 1907 |
| 935,504 | Heybach | Sept. 28, 1909 |
| 1,416,997 | Taylor | May 23, 1922 |
| 1,547,523 | Richards | July 28, 1925 |
| 1,652,994 | Nielsen | Dec. 13, 1927 |
| 1,749,415 | Colby et al. | Mar. 4, 1930 |
| 2,030,951 | Winton | Feb. 18, 1936 |
| 2,651,827 | Oswalt | Sept. 15, 1953 |
| 2,783,872 | Van Schie | Mar. 5, 1957 |
| 2,799,071 | Schenk | July 16, 1957 |
| 2,879,810 | Craig | Mar. 31, 1959 |